No. 651,639. Patented June 12, 1900.
R. M. RAY, Sr.
COMBINATION REEL AND GRIP FOR FISHING RODS.
(Application filed Mar. 15, 1900.)
(No Model.)
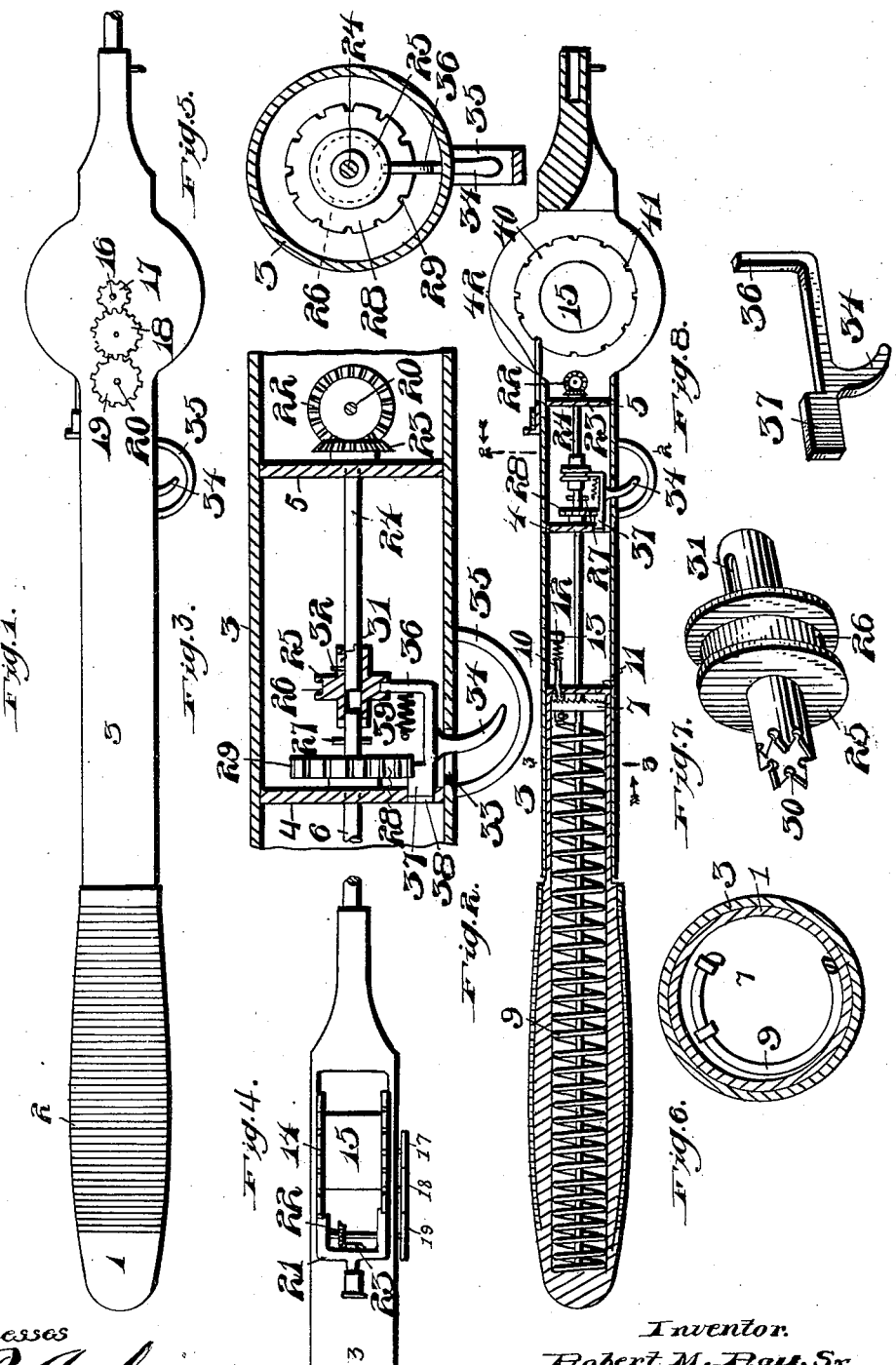
Witnesses
J. P. Appleman,
N. L. Boggs
Inventor.
Robert M. Ray, Sr.
by J. C. Evert & Co.
attorneys

UNITED STATES PATENT OFFICE.

ROBERT M. RAY, SR., OF NEW CASTLE, PENNSYLVANIA.

COMBINATION REEL AND GRIP FOR FISHING-RODS.

SPECIFICATION forming part of Letters Patent No. 651,639, dated June 12, 1900.

Application filed March 15, 1900. Serial No. 8,706. (No model.)

*To all whom it may concern:*

Be it known that I, ROBERT M. RAY, Sr., a citizen of the United States of America, residing at New Castle, in the county of Lawrence and State of Pennsylvania, have invented certain new and useful Improvements in a Combination Reel and Grip for Fishing-Rods, of which the following is a specification, reference being had therein to the accompanying drawings.

This invention relates to certain new and useful improvements in a combination grip and reel, and is particularly adapted for use in connection with fishing-rods for rewinding a fishing-line.

One object of the invention is to construct a grip and reel, the former carrying a suitable mechanism connected to the reel, which when operated will automatically wind up a fishing-line.

A further object of the invention is to provide suitable locking mechanism for the reel and line for retaining the same in a fixed position until the locking mechanism is released, causing thereby the operation of the mechanism carried by the grip and automatically rewinding the line upon the reel.

The invention further aims to construct a combined grip and reel adapted for use in connection with fishing-rods, which will be extremely simple in construction, strong, durable, efficient in its use, and comparatively inexpensive to manufacture.

Briefly described, the invention consists of a hollow grip or handle suitably connected to the reel and carrying spring-actuated operating mechanism for rewinding the line upon the reel, and, further, providing locking means for retaining the reel, as well as the line, in a fixed position until the locking mechanism is released.

The invention finally consists in the novel construction, combination, and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 1 is a side view of my combined grip and reel. Fig. 2 is a longitudinal sectional view thereof. Fig. 3 is an enlarged longitudinal sectional view of the operating mechanism, showing the trigger. Fig. 4 is a top plan view showing the arrangement of the reel. Fig. 5 is an enlarged cross-sectional view taken on the line 2 2 of Fig. 2. Fig. 6 is an enlarged cross-sectional view taken on the line 3 3 of Fig. 2. Fig. 7 is a perspective view of the clutch-sleeve. Fig. 8 is a perspective view of the trigger.

Referring to the drawings by reference-numerals, 1 indicates a hollow grip, which is substantially cylindrical, having its outer face knurled or bound with suitable cord, as at 2, to enable the operator to secure a firm grip upon the same, or any other desirable means may be used for this purpose. A portion of the upper end of the grip 1 is of less diameter than the remainder, and mounted upon this portion is a cylindrical casing 3, provided with partitions 4 5, each of which has a centrally-arranged opening, the purpose of which will be hereinafter described.

Arranged within the grip 1 and the cylindrical casing 3 is an elongated operating-rod 6, which extends entirely through the grip and opening arranged in the partition 4 and carries a ratchet-wheel 7. Mounted upon and suitably secured to the rod 6 within the grip 1 is a coiled tension-spring 9. The upper end of this spring is connected to the ratchet-wheel 7, as shown, which is engaged by a dog 10, operating through a cap 11 of the grip 1. The outer end of the dog is connected to a compression-spring 12, secured to an offset or lug 13, arranged upon the inner face of the cylindrical casing 3. By this arrangement the grip 1 will revolve within the casing 3 when it is desired to wind the tension-spring 9, the dog then riding over the teeth of the ratchet-wheel 7, and when the operation of winding the spring 9 is discontinued the dog will engage the teeth of the ratchet-wheel 7 to prevent the grip from revolving in an opposite direction. Of course it is evident that the operating-rod 6 will extend through the cap 11, the same being provided with an opening for that purpose.

The casing 3 extends over and above a portion of the grip, as shown, at the upper end thereof and carries the reel 14. The hub 15 of the reel is mounted upon the axle 16, carrying at its outer end a pinion 17, meshing with an intermediate gear-wheel 18, which in turn meshes with the gear 19, mounted upon the shaft 20, journaled in the bracket 21, arranged upon the casing, as shown. It will be observed that the hub 15 of the reel sits within the upper end of the casing 3, as well as the shaft 20, which carries a miter-gear 22, meshing with a bevel-gear 23, arranged on the end of the auxiliary operating-rod 24. This rod extends through the partition 5, as will be seen in Fig. 3 of the drawings, and carries on its inner end a clutch-sleeve 25, provided with a peripheral groove 26. The clutch-sleeve 25 is also mounted upon the outer end of the operating-rod 6, and the movement of the sleeve is limited by means of a stop-pin 27, arranged in the end of the rod 6, as shown. The outer end of the rod 6 is further provided with a locking-wheel 28, having a series of notches 29 on its periphery, the function of which will be hereinafter described. The stop-pin is also adapted to engage the slitted end 30 of the clutch-sleeve for locking the rod 6 and the auxiliary operating-rod 24 together, so the same will revolve in the same direction. The sleeve is further provided with an oblong slot 31, in which operates the stop-pin 32, secured to the auxiliary operating-rod.

Mounted within the cylindrical casing 3 and extending through the oblong slot 33 within the casing is an operating-trigger 34, surrounded by a guard 35. The upper end of the trigger 34 is provided with a locking and releasing arm, which is substantially L-shaped in contour and is formed with an upwardly-extending arm 36 at one end thereof and at its opposite end with a locking-lug 37, which operates through the slot 38, formed in the partition 4, and also engages in the notches 29 of the locking-wheel 28. The arm 36 has connected thereto a compression-spring 39 for causing the trigger to resume its normal position by bringing the locking-lug 37 into engagement with the notches 29 and retains the mechanism in an inoperative position.

One side of the hub of the reel is provided with an annular flange 40, having the edge thereof formed with a series of notches 41, which are engaged by the sliding fastening-bar 42, mounted upon the casing 3. This is used to retain the reel in a fixed position to obtain any desired length of line.

The operation of my improved device is as follows: By revolving the grip 1 the same will cause the spring 9 to wind up, and when the grip is released the pawl 10 will engage in the ratchet-wheel 7 to prevent the grip from revolving. By pulling upon the trigger 44 the same will cause the clutch-sleeve to slide upon the two rods, the pointed end thereof engaging the pin 27, locking the two rods together, releasing the lug 37 from its engagement with the locking-wheel 28, and the action of the spring upon the operating-rod 29 will cause the same to revolve, transmitting motion by means of the miter-gear 23 to the bevel-gear 22, revolving the shaft 20 and gear 19, transmitting motion to the intermediate gear 18, and imparting motion thereby to the pinion 17 and operating the reel, causing the line to be wound upon the same. When the trigger is released, the clutch-sleeve will slide from engagement with the pin 27, causing the locking-lug to engage in one of the notches of the wheel 29 and locking the operating mechanism.

It is thought the many advantages of my improved device can be readily understood from the foregoing description, taken in connection with the accompanying drawings, and it will be noted that various changes may be made in the details of construction without departing from the general spirit of my invention.

Having thus fully described my invention, what I claim as new, and desire to secure by Letters Patent, is—

1. The combination of a grip having a tension-spring arranged therein and adapted to be compressed by the rotation of said grip, a casing suitably connected to the grip, means arranged in said casing and grip to hold the latter against rotation, an operating-rod arranged in said casing and grip and adapted to be rotated by the action of said spring, a reel carried by said casing, gearing connected to said reel, and means connected to the operating-rod for actuating said gearing to impart motion to the reel.

2. The combination, with a grip, a coiled tension-spring arranged therein and adapted to be compressed by rotation of the grip, and a casing connected to said grip; of means arranged within the casing and grip to hold the latter against rotation, an operating-rod arranged in said casing and grip, said rod being adapted to be rotated by the action of said spring, a reel carried by said casing, gearing connected to said reel, means connected to the operating-rod for actuating said gearing to impart motion to the reel, and means for locking the operating-rod in an inoperative position.

3. The combination, with a grip, a coiled tension-spring arranged therein and adapted to be compressed by the rotation of the grip, and a casing connected to said grip; of means arranged within the casing and grip to hold the latter against rotation, an operating-rod arranged in said casing and grip and adapted to be rotated by the action of said tension-spring, a reel carried by said casing, connections between said operating-rod and reel whereby motion is imparted to the reel by the operating-rod, and means for locking the operating-rod in an inoperative position.

4. The combination with a hollow grip having a cylindrical casing suitably connected thereto and a spring-actuated operating-rod arranged in said grip and casing, of an auxiliary operating-rod arranged in said casing and suitably connected to a reel, a sliding clutch mounted on said auxiliary operating-rod and adapted to engage said operating-rod, and means for operating said clutch causing the operation of said reel.

5. The combination with a hollow grip having a cylindrical casing suitably connected thereto and a spring-actuated operating-rod arranged in said grip and casing, of an auxiliary operating-rod arranged in said casing and suitably connected to a reel, a sliding clutch mounted on said auxiliary operating-rod and adapted to engage said operating-rod, a trigger adapted to operate said clutch causing thereby the operation of said reel, and means carried by said trigger for locking said operating-rod in an inoperative position.

6. The combination of a hollow grip having a coiled tension-spring suitably arranged therein which is adapted to be compressed by revolving the said grip, a casing suitably connected to said grip, means arranged in said casing and grip to prevent the rotating of said grip, an operating-rod arranged in said casing and said grip and adapted to be rotated by the action of said spring, a reel suitably connected to said casing, a train of gearing in communication with said reel, and means adapted to be connected to said operating-rod for operating said gearing thereby imparting motion to said reel.

7. The combination of a hollow grip having a coiled tension-spring suitably arranged therein which is adapted to be compressed by revolving the said grip, a casing suitably connected to said grip, means arranged in said casing and grip to prevent the rotating of said grip, an operating-rod arranged in said casing and said grip and adapted to be rotated by the action of said spring, a reel suitably connected to said casing, a train of gearing in communication with said reel, means adapted to be connected to said operating-rod for operating said gearing thereby imparting motion to said reel, and means for locking said operating-rod in an inoperative position.

8. The combination with a hollow grip having a coiled tension-spring suitably arranged therein which is adapted to be compressed by revolving the said grip, a casing suitably connected to said grip, means arranged in said casing and grip to prevent the rotating of the said grip, an operating-rod arranged in said casing and said grip and adapted to be rotated by the action of said spring, a reel suitably connected to said casing, a train of gearing in communication with said reel, means adapted to be connected to said operating-rod for operating said gearing thereby imparting motion to said reel, means for locking said operating-rod in an inoperative position, and a fastening-arm arranged upon said casing for arresting the movement of said reel.

In testimony whereof I affix my signature in the presence of two witnesses.

ROBERT M. RAY, SR.

Witnesses:
JOHN NOLAND,
E. W. ARTHUR.